United States Patent Office 2,698,415
Patented Dec. 28, 1954

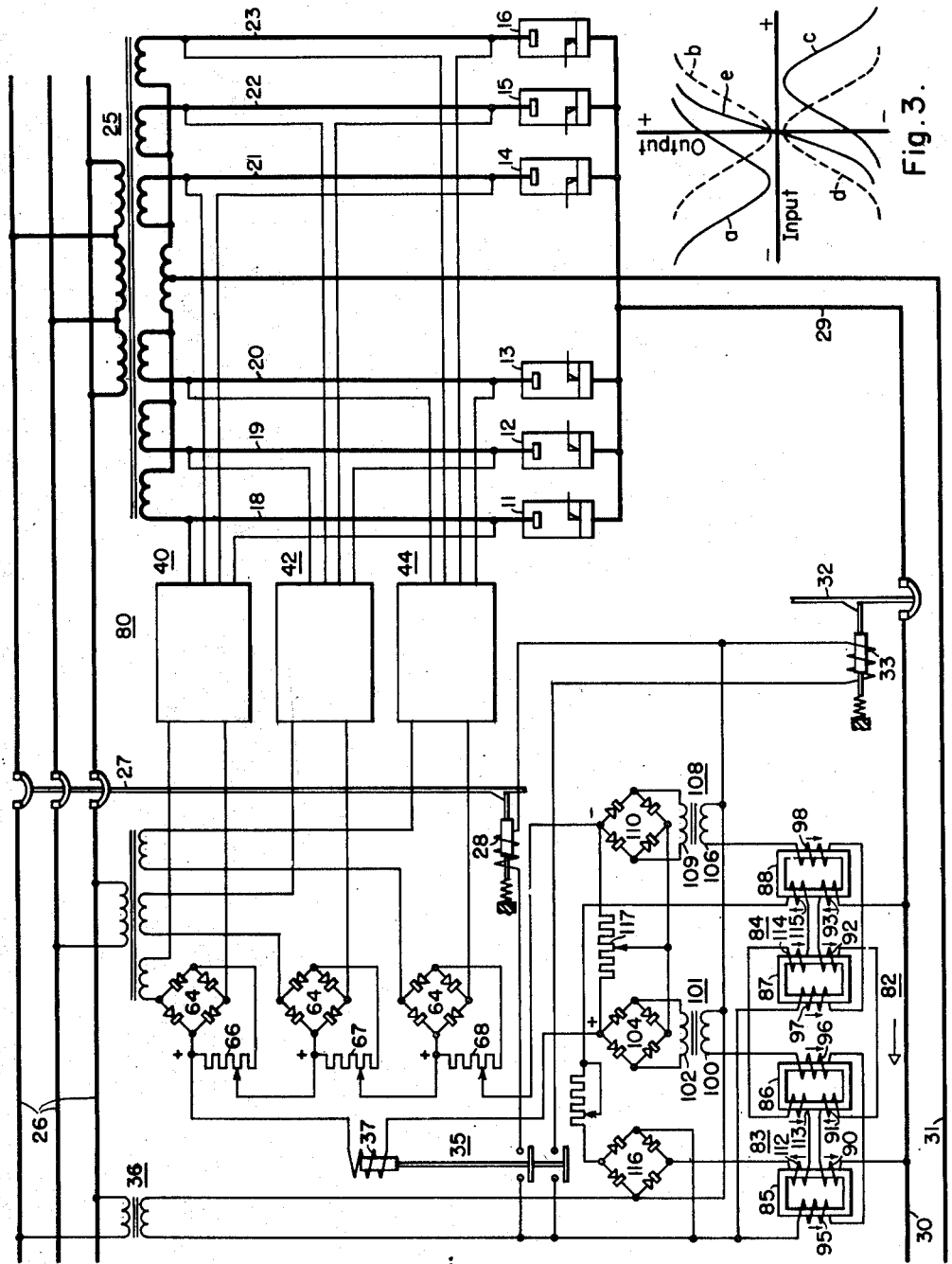

2,698,415

PROTECTIVE SYSTEM

Willard A. Derr, Pittsburgh, and Edward J. Cham, Irwin, Pa., assignors to Westinghouse Electric Corporation, East Pittsburgh, Pa., a corporation of Pennsylvania Application December 5, 1952, Serial No. 324,281

10 Claims. (Cl. 321—12)

Our invention relates, generally, to protective systems and has reference, in particular, to differential protective systems for direct-current circuits and apparatus.

Generally stated, it is an object of our invention to provide in a novel manner for effecting differential protection of both direct-current circuits and apparatus.

More specifically, it is an object of our invention to provide in a direct-current circuit for using magnetic amplifiers to obtain indications of the currents in the different circuits or parts thereof and for utilizing the outputs of the magnetic amplifiers on the input and output of the circuit or a part thereof to operate a differential protective relay.

Another object of our invention is to provide for using polarity responsive magnetic amplifiers to obtain electrically isolated current indications of the currents in a direct-current bus and associated feeders and for cumulatively adding the outputs of the amplifiers of the several feeders and applying the resultant in opposition to the output of the bus magnetic amplifiers, to a differential relay for operating circuit breakers connecting the bus and feeders.

Yet another object of our invention is to provide for protecting a rectifier system against faults by using magnetic amplifiers to obtain indications of the anode currents of the several phases, totalizing the outputs of these magnetic amplifiers and connecting the output of a magnetic amplifier in the cathode circuit of the rectifier in opposition therewith to a differential relay, for tripping the alternating and direct-current circuit breakers of the rectifier in the event of an arc-back or the like.

Other objects will, in part, be obvious and will, in part, be explained hereinafter.

In practicing our invention in accordance with one of its embodiments, magnetic amplifiers are used to produce alternating-current outputs in accordance with the direct currents in the several anode conductors of a rectifier. These outputs are rectified and are applied cumulatively to a differential protective relay, in opposition to the direct-current output from a shunt in the cathode circuit of the rectifier. The protective relay is used to trip both the alternating-current and cathode circuit breakers, which respectively connect the rectifier to an alternating-current source and to a direct-current bus, in the event that an unbalance occurs between the anode and cathode currents, as is the case with an arc-back.

For a more complete understanding of the nature and scope of our invention, reference may be made to the following detailed description, which may be read in connection with the accompanying drawings, in which:

Fig. 2 is a diagrammatic view of a rectifier system embodying the invention in a different form;

Fig. 3 shows curves illustrating the output characteristics of the magnetic amplifiers used in the system of Fig. 2;

Figure 1:
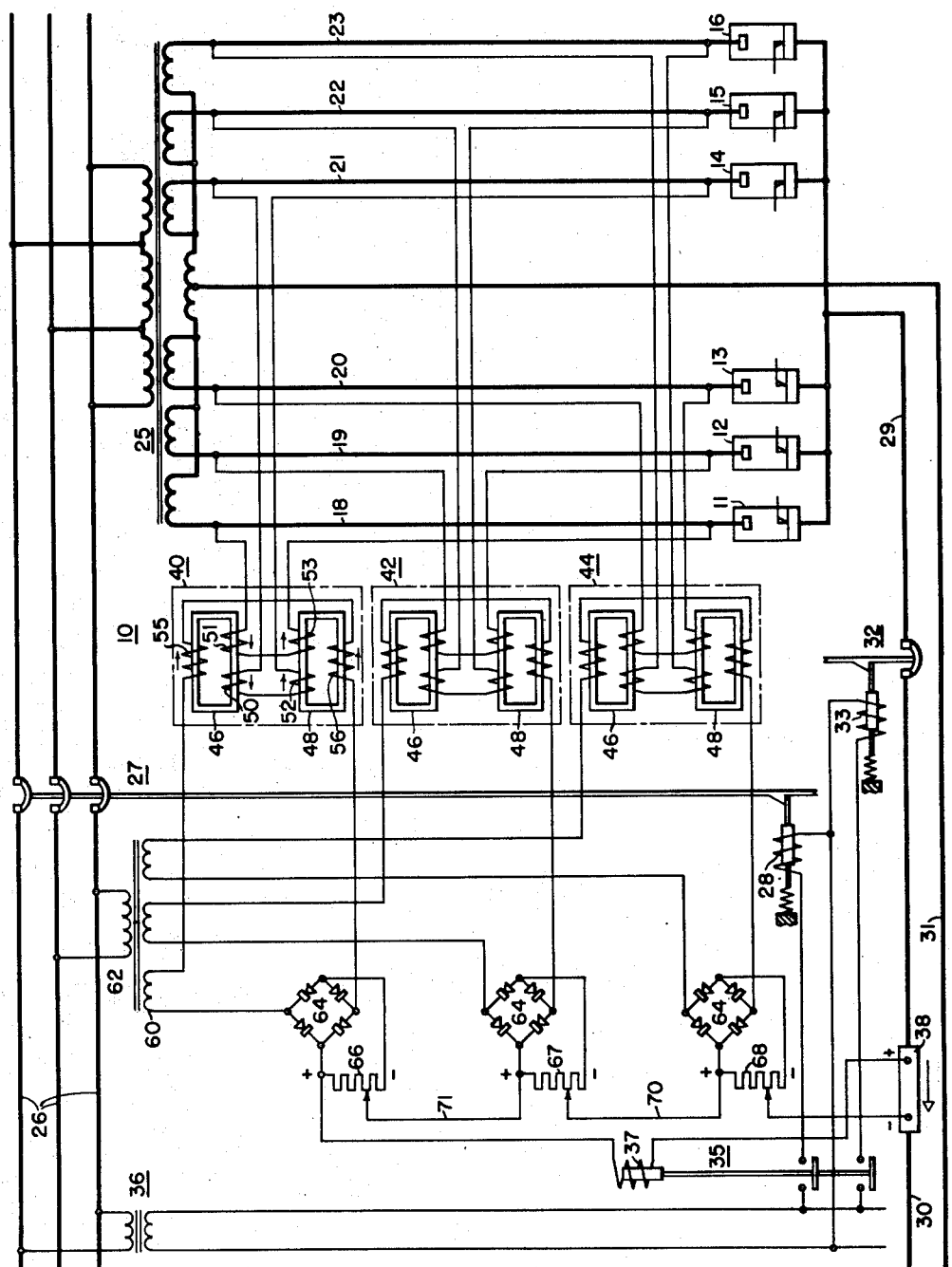
Figure 1 is a diagrammatic view of a rectifier system embodying the invention in one of its forms.

Referring to Fig. 1, the reference numeral 10 denotes generally a rectifier system in which a plurality of arc discharge devices 11 through 16 are connected by means of anode conductors 18 through 23 to the secondary windings of a polyphase transformer 25 disposed to be connected to the conductors 26 of an alternating-current source by means of an alternating-current circuit breaker 27 having a trip device 28. The arc discharge devices may be connected by a cathode conductor or bus 29 to a direct-current circuit represented by conductors 30 and 31 through a cathode circuit breaker 32 having a trip device 33. Suitable firing circuits (not shown) may be utilized for controlling the conductivity of the arc discharge devices in any manner well known in the art.

In order to provide for protecting the rectifier system against faults such as arc-backs, a differential protective relay 35 may be provided for connecting the trip devices 28 and 33 to a source of alternating current represented by the transformer 36. Operation of the protective relay 35 may be effected by connecting its operating winding 37 to be energized in accordance with a differential between the current in the cathode circuit and the sum of the currents in the anode circuits. An indication of the direct current in the cathode circuit may be obtained from means such as a direct-current shunt 38 connected between the cathode conductor 29 and the direct-current conductors 30, the direction of current flow being represented by the open-headed arrow.

In order to provide a totalized indication of the currents in the several anode circuits, means, such as the magnetic amplifiers 40, 42 and 44, may be utilized. Since these magnetic amplifiers are substantially identical, only the magnetic amplifier 40 will be described in detail, it being understood that the connections of the other magnetic amplifiers will be different insofar as they are associated with different ones of the anode conductors.

The magnetic amplifier 40 may comprise a pair of closed magnetic cores 46 and 48 which, while shown as rectangular, may have other shapes, being, for example, toroidal, if desired. Each of these cores may be provided with a plurality of windings including a pair of control windings 50, 51 and 52, 53, respectively. Each of the cores may also be provided with an alternating-current winding, such as the windings 55 and 56, respectively. The control windings 51 and 53 may be connected to be energized in accordance with the currents in the anode conductors, being, for example, connected to shunts therein or to spaced apart points on the anode conductor 18, so as to be energized in accordance with the voltage drop between these points, and accordingly, in accordance with the current in the anode conductor 18. The fluxes produced thereby are represented by the solid-headed arrows. The control windings 50 and 52 may be similarly connected to spaced apart points on the anode conductor 21 so as to be energized in accordance with the current in that anode conductor. The control windings 50 and 52 may be so connected as to be cumulative with respect to their associated control windings 51 and 53 for effecting magnetization of the cores 46 and 48 in accordance with the sum of the currents in the conductors 18 and 21. The control windings are thereby effective to vary the impedance of the alternating current windings inversely as the currents in the anode conductors.

The alternating-current windings 55 and 56 may be connected in series circuit relation with each other and to a source of alternating current, being, for example, connected to a secondary winding 60 of an alternating-current transformer 62 which may be energized from the conductors 26. They are so connected that alternating current voltages induced thereby in the windings 51, 53 and 50, 52 neutralize each other, as indicated by the closed-headed arrows. A full-wave bridge rectifier circuit 64 may be connected in series circuit relation with the control windings 55 and 56 and the transformer winding 60 for producing a direct-current voltage across a resistor 66 which is proportional to the sum of the direct currents in the anode conductors 18 and 21.

The magnetic amplifiers 42 and 44 may be similarly connected to spaced points on the anode conductors 19, 22 and 20, 23, respectively, for producing similar direct-current voltages across resistors 67 and 68 associated with other rectifier bridge circuits 64, in accordance with the currents through the other anode conductors. The resistors 66, 67 and 68 may be connected in series circuit relation and cumulatively with respect to each other by means of conductors 70 and 71 to produce a voltage which is proportional to the totalized sum of the currents in the anode conductors 18 through 23. These resistors may then be connected to the operating winding 36 of the differential protective relay in opposition to the output obtained from the shunt 38.

So long as the rectifier system is operating normally, the sum of the currents in the several anode conductors will equal the current in the cathode conductor even though the values thereof vary over a wide range, and accordingly the sum of the voltages across the resistors 66, 67 and 68 will be equal and opposite to the voltage from the shunt 38, so that the differential relay 35 will remain in the deenergized position. Should an arc-back occur, and the current in one of the anode conductors reverse, the current in the cathode conductors must diminish. Since the magnetic amplifiers 40, 42 and 44 are not polarity responsive, the output voltages across the resistors 66, 67 and 68 will not be appreciably effected. However, since the cathode current is reduced, the voltage across the shunt 38 will be reduced. The summation of the voltages across the resistors 66, 67 and 68 will now be greater than the voltage from the shunt 38, and accordingly current will flow through the operating winding 37 of the differential relay causing the relay to operate. Obvious energizing circuits are thereupon provided for the trip devices 28 and 33, causing the circuit breakers 27 and 32 to open and disconnect the rectifier system 10 from both the alternating-current source and the direct-current circuit.

Referring to Fig. 2, the reference numeral 80 may denote generally a rectifier system in which a plurality of arc discharge devices 11 through 16 are connected by means of anode conductors 18 through 23 to the several secondary windings of a polyphase transformer 25 which is energized from a source represented by the alternating-current conductors 26 through an alternating-current circuit breaker 27 having a trip device 28. The rectifier circuit may be connected to a direct-current system represented by the conductors 30 and 31, by means of a direct-current circuit breaker 32 having a trip device 33, and which is connected in circuit with the cathode conductor 29 of the rectifier. A differential protective relay 35 having an operating winding 37 may be provided for effecting operation of the trip devices 28 and 33 in the event of a fault such as an arc-back or the like. The differential relay may be energized in accordance with a differential between the sum of the currents in the several anode conductors, and the current in the cathode conductor 29.

Instead of utilizing a direct-current shunt, as in the system of Fig. 1, for directly obtaining an indication of the direct current in the cathode conductor, a magnetic amplifier circuit 82 may be utilized. The magnetic amplifier circuit may comprise a pair of magnetic amplifiers 83 and 84, each magnetic amplifier comprising a pair of cores of magnetic material 85, 86 and 87, 88, respectively. Each core may be provided with a plurality of windings. For example, the cores 85, 86, 87 and 88 may be provided with control windings 90, 91, 92 and 93 which may be connected in series circuit relation either to a shunt in series with the direct current conductor or bus 30 or to spaced apart points on the direct-current bus so as to be energized in accordance with the drop between these points and hence in accordance with the direct current in the cathode conductor. The cores may likewise be provided with alternating-current windings 95, 96, 97 and 98. The windings 95 and 96 may be connected in series circuit relation with each other and with the primary winding 100 of an output transformer 101 having a secondary winding 102 which is connected across a rectifier bridge circuit 104. The windings 95 and 96 are preferably connected in opposite senses relative to their respective control windings 90 and 91 so as to neutralize induction in the control windings. The windings 95, 96 and 100 may be connected to a source of alternating current represented by a control transformer 36 energized from the conductors 26. The alternating-current windings 97 and 98 may be similarly connected to the transformer 37 in series with the primary windings 106 of an output or coupling transformer 108 having a secondary winding 109 connected across a rectifier bridge circuit 110.

Each of the cores may be provided with a bias winding, such as the windings 112, 113, 114 and 115. These windings may be connected to a source of direct current represented by a rectifier bridge circuit 116 so that the windings 112 and 113 are differential with respect to the windings 90 and 91 while the windings 114 and 115 are cumulative with respect to the windings 92 and 93, respectively.

By referring to Fig. 3, it will be seen that the output of the magnetic amplifier 84 as measured at the rectifier bridge circuit 104 may be represented by the curve $(a)$, which is shifted to the left from the unbiased position represented by the dotted curve $(b)$ by reason of the cumulative effects of the bias windings, while the output of the magnetic amplifier 83 may be represented by the curve $(c)$, which is shifted to the right from the unbiased position represented by the dotted curve $(d)$, by reason of the differential bias. By connecting the rectifier bridge circuits 104 and 110 in opposed circuit relation to a voltage divider 117, a reversible differential output voltage may be obtained from the magnetic amplifier circuit 82 which may be represented by the curve $(e)$.

By using magnetic amplifiers 40, 42 and 44 similar to those of the system of Fig. 1 and utilizing rectifier bridge circuits such as the bridge circuits 64 to produce direct-current voltages across resistors 66, 67 and 68 in the manner hereinbefore described, the summation of these voltages may be applied to the operating winding 37 of the protective relay 35 in opposition to the output voltage from the magnetic amplifier circuit 82, and this will be balanced under normal operating conditions, The relay 35 will thus remain in the deenergized position.

Should an arc-back occur, the cathode current will be reduced while the current in the anode circuit of the faulted arc discharge device will reverse. Since the magnetic amplifiers 40, 42 and 44 are not polarity responsive, the totalized output therefrom will still represent substantially a numerical summation of the currents in the anode conductors. The cathode current will be reduced or even reversed due to feedback. A reduction in the cathode current of the rectifier increases the saturation of the cores 85 and 86 and decreases that of the cores 87 and 88. The impedance of alternating-current windings 95 and 96 will thus decrease, while that of windings 97 and 98 will be increased. Accordingly, the current through the output transformer 101 increases, while that through the transformer 108 decreases in accordance with the change in the cathode current. The differential voltage across the resistor 117 will, therefore, be reduced and a current will flow through the operating winding 37 by reason of the summation voltage from the resistors 66, 67 and 68. The relay 35 operates and provides obvious energizing circuits for the trip devices 29 and 33. In the event that the cathode current does reverse, the differential voltage across the resistor 117 will reverse, thus also causing operation of relay 35.

Figure 4:
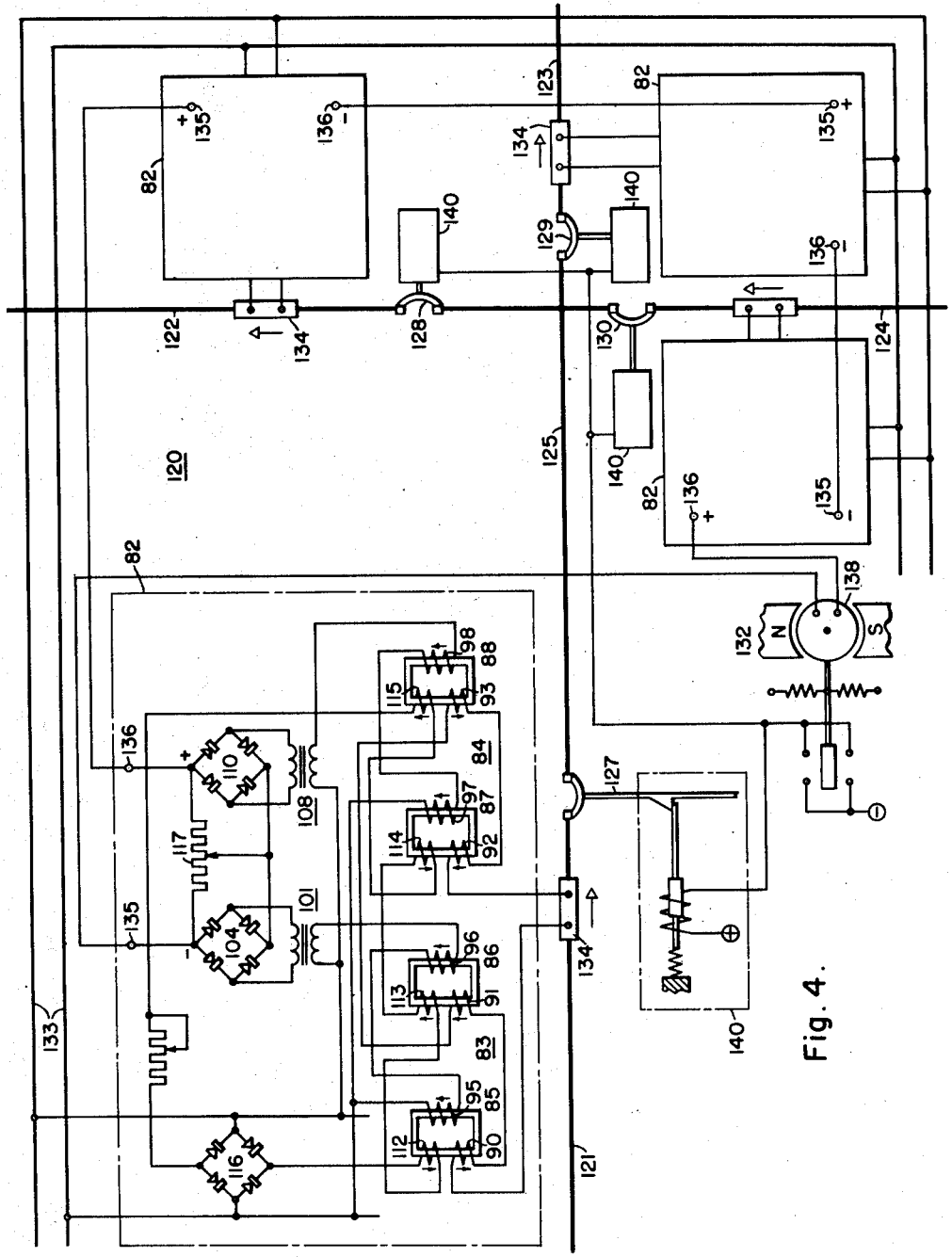
Fig. 4 is a diagrammatic view of a bus and feeder system embodying our invention in one of its forms.

Referring to Fig. 4, the numeral 120 may represent generally a station bus and feeder system wherein a plurality of feeders 121, 122, 123 and 124 may be connected to a direct-current bus 125 by means of circuit breakers 127, 128, 129 and 130, respectively. The feeders may have different directions of current flow, the feeders 121 and 124, for example, supplying current to the bus 125, while the feeders 122 and 123 are supplied therefrom as indicated by the open-tip arrows. In order to provide protection against faults, means such as polarity responsive differential protective relay 132 may be provided for tripping the several circuit breakers. A polarity responsive indication of the current in each of the feeders may be provided by magnetic amplifier circuits 82 associated with each of the feeders. Since these circuits are identical, only one of them is illustrated in detail and the explanation of that circuit will apply to the other circuits which are merely shown in the form of enclosures. The terminal polarities will depend on the direction of current flow in the associated feeder.

Each of the magnetic amplifier circuits 82 may comprise a pair of magnetic amplifiers 83 and 84, each of these magnetic amplifiers having magnetic cores 85, 86 and 87, 88, respectively, as described in connection with the magnetic amplifier circuit 82 of the system shown in Fig. 2.

The control windings 90, 91, 92 and 93 may be connected to a shunt 134 connected in series with its respective feeder, and the alternating-current windings 95 and 96, 97 and 98 may be connected to a source of alternating current represented by conductors 133 in connection with output transformers 101 and 108 for producing direct-current voltages across rectifier bridge circuits 104 and 110 connected in opposition to a voltage divider 117. A rectifier bridge circuit 116 energized from conductors 133 is utilized to provide energization of the bias windings 112, 113, and 114, 115 to effect cumulative and differential energization thereof, respectively, with respect to the control windings of the magnetic amplifiers 83 and 84 in the manner similar to that hereinbefore described.

By connecting the output terminals 135 and 136 of the magnetic amplifier circuits in series circuit relation to the moving coil 138 of the protective relay 132, operation of the relay may be effected whenever an unbalance occurs. Since the magnetic amplifier circuits are all connected with the same sense of polarity, a feeder which is conducting current away from the bus 125 will have a reverse polarity at its output terminals with respect to one which is supplying current to the direct-current bus, as is the case with the feeder 121 as illustrated.

Since under a normal condition, the sum of the currents entering the bus must equal the sum of the currents leaving the bus, the output voltages of all of the magnetic amplifiers will exactly balance, and the protective relay 132 will remain in the deenergized position as shown. Should a fault occur on the bus 125, this balanced condition will no longer maintain, and accordingly an unbalance voltage will appear across the moving coil 138 of the relay 132 causing the relay to operate. An obvious energizing circuit is thereupon provided for the several trip devices 140 of the circuit breakers.

Figure 5:
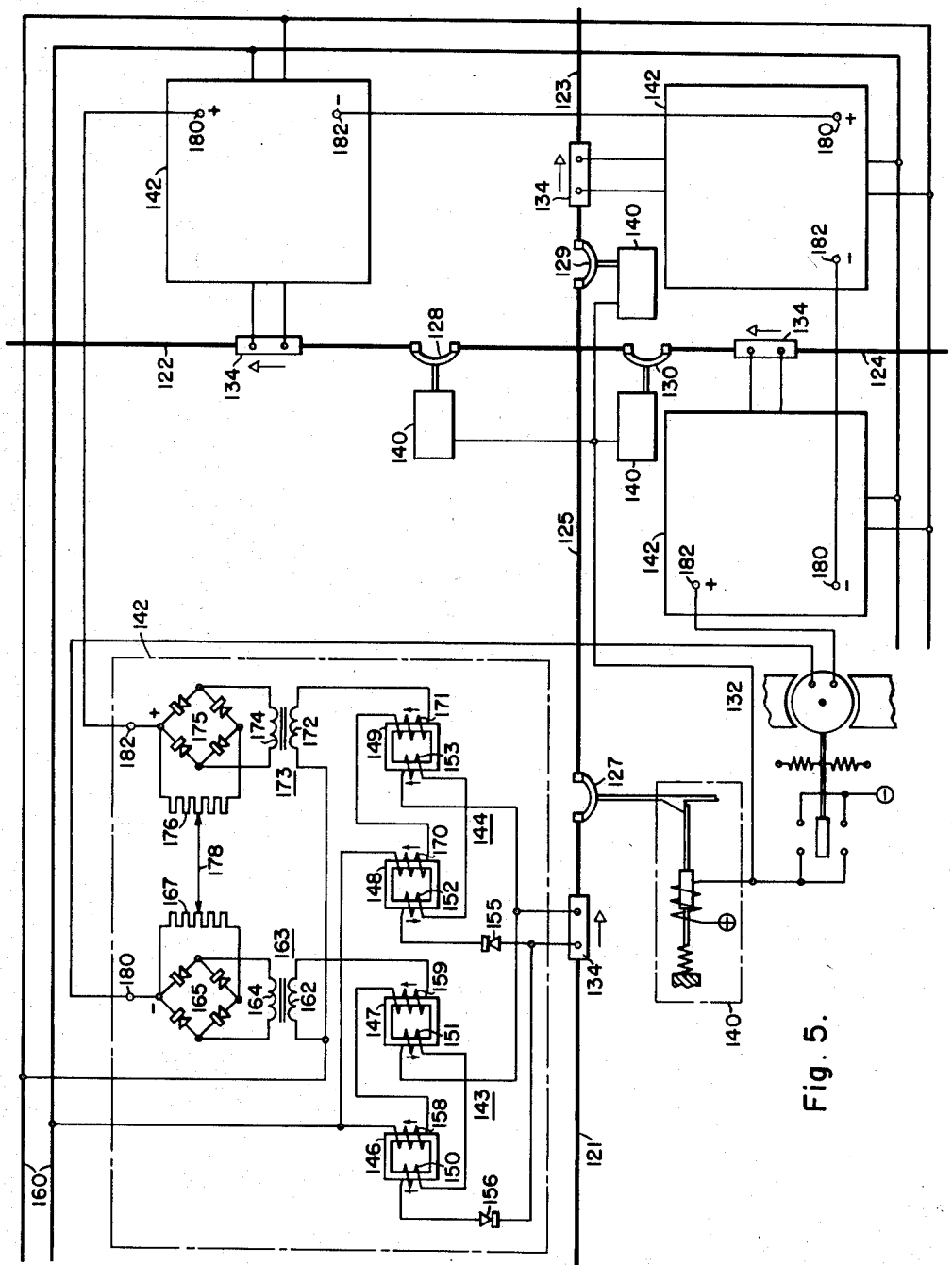
Fig. 5 is a diagrammatic view of a bus and feeder system embodying the invention in a different form.

Referring to Fig. 5, it will be seen that magnetic amplifier circuits 142 may be provided in connection with each of the feeders 121, 122, 123 and 124 for effecting the differential protection of the direct-current bus 125. Each of the magnetic amplifier circuits 142 may comprise a pair of magnetic amplifiers 143 and 144. The magnetic amplifiers may comprise pairs of magnetic cores 146, 147, and 148, 149, respectively. The cores may be provided with control windings 150, 151, 152, 153.

The windings 152 and 153 may be connected in series circuit relation across a shunt 134 in the feeder 121 in circuit with a rectifier device 155 so as to be energized when the current is flowing in the feeder 121 in the direction indicated by the open tip arrow. The control windings 150 and 151 may be connected to the shunt 134 in series with a rectifier device 156 so as to be energized for a reverse direction of current flow. The cores 146 and 147 may be provided with alternating-current windings 158 and 159 connected to an alternating-current source represented by conductors 160 through the primary winding 162 of an output transformer 163 whose secondary winding 164 is connected to a rectifier bridge circuit 165 for producing a direct-current voltage across a voltage divider 167 in accordance with the current through the shunt 134. The cores 148 and 149 may be provided with alternating-current windings 170 and 171 connected to the alternating-current conductors 160 through the primary winding 172 of an output transformer 173 having a secondary winding 174 connected to a rectifier bridge circuit 175 for producing a direct-current voltage across a voltage divider 176. By connecting the voltage dividers 167 and 176 by means of a conductor 178, a reversible differential voltage may be produced between terminals 180 and 182 of the magnetic amplifier circuit 142, having a polarity as indicated for the direction of current flow represented by the open tip arrow.

By connecting the output terminals of the several magnetic amplifier circuits in the same polarized sense, a zero differential output will result under normal conditions since the polarity of the output circuits of the magnetic amplifiers is dependent on the direction of current flow in its associated feeder. Since the sum of the currents flowing into the bus 125 will equal the sum of the currents leaving the bus through the different feeders under normal conditions, the polarity responsive protective relay 132 will normally be deenergized. Should a fault occur on the bus 125, this balance condition will no longer be maintained as to the bus and feeder currents. It will also no longer be maintained as to the outputs from the magnetic amplifier circuits, since their outputs are proportional to and directional as to the currents in their respective feeders. Accordingly, the relay 132 will be energized in response to the differential, and obvious energizing circuits will be provided for the several trip devices 140.

From the above description and the accompanying drawings, it will be apparent that we have provided in a simple and effective manner for totalizing the indications of the currents in the several anode conductors of the rectifier system or of the several feeders in a bus and feeder circuit, so that the resultant may be readily balanced against the cathode current or the current of the supply feeder. Thus we are readily able to obtain differential protection of direct-current circuits and apparatus without fear of electrically interconnecting different circuits which may be at widely different potentials. In addition, the relay circuits are maintained at low potentials, requiring less insulation and reducing shock hazards.

Since certain changes may be made in the above-described construction, and different embodiments of the invention may be made without departing from the spirit or scope thereof, it is intended that all the matter contained in the above description or shown in the accompanying drawings, shall be considered as illustrative and not in a limiting sense.

We claim as our invention:

1. In protective apparatus for a direct-current supply system wherein direct-current energy is transferred between a principal conductor and a plurality of other conductors, a plurality of magnetic amplifiers including cores of magnetic material having control windings thereon connected to be energized in accordance with the currents in said other conductors and having additional windings thereon, circuit means including a rectifier connecting each of said additional windings to a source of alternating current for producing direct-current output voltages proportional to the currents in said other conductors, means producing a direct-current voltage proportional to the current in the principal conductor, a differential relay, and circuit means connecting the differential relay to be energized in accordance with a differential between the direct-current voltage proportional to the current in the principal conductor and the sum of the output voltages of the additional windings of the magnetic amplifiers.

2. In a protective circuit for a direct-current system in which electrical energy is transferred between a bus and a plurality of conductors, a plurality of magnetic amplifiers having control windings energized in accordance with the currents in said conductors and having alternating-current windings magnetically coupled therewith, a plurality of rectifiers including a rectifier connected in circuit with each of said alternating-current windings, an additional magnetic amplifier having a control winding energized in accordance with the current in the bus and having an alternating current winding magnetically coupled therewith, a rectifier connected in circuit with said alternating current winding, and a relay connected to be energized in response to a differential between the output of said last-mentioned rectifier and the cumulative outputs of said plurality of rectifiers.

3. In a protective circuit for a direct-current supply system wherein direct-current energy is transferred between a principal conductor and another conductor, means for producing a direct-current voltage proportional to the current in said principal conductor, a magnetic amplifier having a core of magnetic material magnetically linked with a conductor carrying a current proportional to that of said another conductor and having an additional winding, circuit means including a rectifier device connecting said additional winding to a source of alternating current to produce a direct-current voltage proportional to the current in said another conductor, a differential relay, and a circuit connected to apply said voltages to the differential relay in opposed relation.

4. In protective apparatus for a direct-current system wherein direct-current electrical energy is transferred between a principal bus and a plurality of associated feeder conductors, means for producing a direct-current voltage proportional to the current in the principal bus, a plurality of magnetic amplifiers having magnetic core members with control windings thereon connected to spaced apart points of the plurality of feeder conductors and having additional windings thereon, a circuit including a rectifier device connecting each of the additional windings to an alternating current source to produce a plurality of direct current voltages, a protective relay, and a circuit connected to apply said plurality of voltages to the relay in cascade and in opposition to the voltage proportional to the current in the principal bus.

5. In protective apparatus for a polyphase rectifier having a plurality of anode conductors for connecting the rectifier to a source of alternating current and a cathode bus for connecting the rectifier to a direct-current system, means for producing a voltage proportional to the cathode current, a plurality of magnetic amplifiers having closed magnetic cores with control windings thereon connected one to each of the anode conductors to be energized in accordance with the direct current therein and having additional windings, a plurality of circuits each including a dry type rectifier device connecting the additional windings to an alternating-current source for producing separate direct-current voltages proportional to the currents in said anode conductors, a differential relay, and circuit means for applying said separate direct-current voltages cumulatively to the relay in opposed relation to the voltage from the cathode bus.

6. In protective apparatus for a rectifier having a plurality of anode conductors connecting it to a source of alternating current and a cathode bus connecting it to a direct-current circuit, a pair of magnetic amplifiers associated with each pair of said plurality of anode conductors, said magnetic amplifiers each comprising a magnetic core having a plurality of control windings and an additional winding thereon, a circuit connecting one control winding on each of a pair of magnetic amplifiers in series and in shunt with a portion of one of said anode conductors, another circuit connecting the other control windings of said pair of magnetic amplifiers in series cumulatively with respect to the other control windings of said pair and in shunt with a portion of another of said anode conductors, means including a rectifier circuit connecting the additional windings to a source of alternating current in opposite senses relative to the control windings to produce a direct-current voltage proportional to the currents in said one and another of said anode conductors, means for producing a polarity responsive direct-current voltage proportional to the current in the cathode bus, a protective relay, and a circuit connected to apply said polarity responsive voltage to the protective relay in opposition to the cumulative sum of the voltages from said pairs of magnetic amplifiers.

7. In a protective system for a reactifier circuit having a plurality of anode conductors for connection by an alternating-current circuit breaker to a source of alternating current and a cathode bus for connection by a direct-current circuit breaker to a direct-current circuit, a protective relay for tripping said circuit breaker, two pairs of magnetic amplifiers each comprising a closed magnetic core with a control winding on each connected in series circuit with each other in shunt with a portion of the cathode bus, said cores each having an additional winding and a bias winding, a circuit connecting the bias windings on one pair of cores to be energized cumulatively with respect to the control windings thereof and the bias winding of the other pair of cores to be energized differentially with respect to the control windings thereof, circuit means connecting the additional windings of the magnetic amplifiers of each pair to a source of alternating current, said circuit means including an output transformer, additional circuit means including rectifier bridge circuits connected to the output transformers and in opposed relation with each other to produce a reversible direct-current voltage in accordance with the direction and magnitude of the current in the cathode bus, circuit means for producing a plurality of direct-current voltages in accordance with the currents in said anode conductors and a circuit connected to normally apply said plurality of voltages additively to the protective relay in opposition to said reversible direct-current voltage.

8. In a rectifier system, a polyphase rectifier having a plurality of anode conductors and a cathode conductor, a circuit breaker connecting the anode conductors to a source of alternating current, a cathode breaker connecting the cathode conductor to a direct current circuit, a protective relay operable to trip said breakers, a pair of magnetic amplifiers for each pair of anode conductors, each of said magnetic amplifiers comprising a closed magnetic core having a pair of control windings and an additional winding thereon, a circuit connecting one control winding on each of a pair of said magnetic amplifiers in series to spaced points on one of the anode conductors, another circuit connecting the other control winding on each of said pair of magnetic amplifiers in series to spaced points on the other anode conductor of said pair and cumulatively with respect to said one control winding, a circuit including a rectifier circuit connecting the additional windings of each pair of magnetic amplifiers to a source of alternating current in opposite senses to the control windings thereof for producing direct-current voltages proportional to the currents in the pairs of anode conductors, means producing a polarity responsive direct-current voltage in accordance with current in the cathode conductor, and a circuit connected to normally apply the polarity responsive voltage to the protective relay in opposition to the additive sum of the direct-current voltages from said pairs of magnetic amplifiers.

9. In a protective system for a direct-current bus and feeder system having one or more direct-current feeders connected to supply electrical energy to the bus and one or more feeders connected to the bus for receiving energy therefrom, a circuit breaker connecting each feeder to the bus, a protective relay connected to trip said circuit breakers, a plurality of magnetic amplifiers associated with each feeder comprising closed cores of magnetic material having a plurality of windings thereon, a circuit connecting one winding of each of said plurality of magnetic amplifiers to spaced apart points on the feeder associated therewith, an additional circuit connecting another winding of each of the magnetic amplifiers of said plurality to a direct-current source of bias voltage, circuit means connecting another winding of each of the magnetic amplifiers of said plurality to a source of alternating current including rectifier means connected in opposed relation to provide a reversible output voltage dependent on the value and direction of the current in the associated feeder, and a circuit connecting the rectifier means to the protective relay to operate the protective relay in response to a differential between the currents of the supply and receiving feeders.

10. In combination, a plurality of circuit breakers for connecting a plurality of feeders to a common direct-current bus in energy transferring relation, a master relay connected to effect tripping of all of said breakers, a magnetic amplifier associated with each feeder having a pair of cores of magnetic material each with a plurality of windings thereon, circuit means including a rectifier connecting one winding of each of the pair of cores to spaced apart points on its associated feeder for energization in response to current flow in opposite directions, circuit means including a rectifier circuit connecting another winding of each core to an alternating current source to produce polarity responsive direct-current voltages, and circuit means connecting the rectifier circuits of the plurality of feeders in circuit with the protective relay with the rectifier circuits of the cores of each pair disposed in opposed relation.

References Cited in the file of this patent

UNITED STATES PATENTS

| Number | Name | Date |
| --- | --- | --- |
| 1,792,099 | Kern | Feb. 10, 1931 |
| 2,354,158 | Taliaferro | July 18, 1944 |
| 2,434,214 | Lerstrup | Jan. 6, 1948 |
| 2,672,584 | Rolf | Mar. 16, 1954 |

FOREIGN PATENTS

| Number | Country | Date |
| --- | --- | --- |
| 86,882 | Sweden | July 21, 1936 |
| 617,840 | Great Britain | Feb. 11, 1949 |